(12) United States Patent
Dvir et al.

(10) Patent No.: US 11,265,575 B2
(45) Date of Patent: Mar. 1, 2022

(54) IMAGE AND VIDEO PROCESSING APPARATUSES AND METHODS

(71) Applicant: HUAWEI TECHNOLOGIES CO., LTD., Shenzhen (CN)

(72) Inventors: Itsik Dvir, Munich (DE); Natan Peterfreund, Munich (DE); Dror Irony, Munich (DE); David Drezner, Munich (DE); Ady Ecker, Munich (DE); Amiram Allouche, Munich (DE)

(73) Assignee: Huawei Technologies Co., Ltd., Shenzhen (CN)

(*) Notice: Subject to any disclaimer, the term of this patent is extended or adjusted under 35 U.S.C. 154(b) by 11 days.

(21) Appl. No.: 16/880,653

(22) Filed: May 21, 2020

(65) Prior Publication Data
US 2020/0288165 A1    Sep. 10, 2020

Related U.S. Application Data

(63) Continuation of application No. PCT/EP2017/079929, filed on Nov. 21, 2017.

(51) Int. Cl.
*H04N 19/547* (2014.01)
*H04N 19/55* (2014.01)
*H04N 19/567* (2014.01)

(52) U.S. Cl.
CPC .......... *H04N 19/547* (2014.11); *H04N 19/55* (2014.11); *H04N 19/567* (2014.11)

(58) Field of Classification Search
CPC .... H04N 19/547; H04N 19/55; H04N 19/567; H04N 19/157; H04N 19/12; H04N 19/176; H04N 19/60
See application file for complete search history.

(56) References Cited

U.S. PATENT DOCUMENTS

| 8,165,352 B1* | 4/2012 | Mohanty ............ G06K 9/00288 382/115 |
| 2011/0135212 A1* | 6/2011 | Alshina ................ H04N 19/176 382/250 |

FOREIGN PATENT DOCUMENTS

| WO | 2011071325 A2 | 6/2011 |
| WO | 2012006568 A1 | 1/2012 |

(Continued)

OTHER PUBLICATIONS

Yousefi (Imposing boundary and interface conditions in multi-resolution wavelet Galerkin method for numerical solution of Helmholtz problems—http://dx.doi.org/10.1016/j.cma.2014.02.017—Available online Mar. 19, 2014) (Year: 2014).*

(Continued)

*Primary Examiner* — Nasim N Nirjhar
(74) *Attorney, Agent, or Firm* — Leydig, Voit & Mayer, Ltd.

(57) ABSTRACT

The invention relates to an image processing apparatus for compressing or decompressing a segment of an image. The segment includes a plurality of pixels, each pixel includes a pixel value and a pixel position defined by a first coordinate system. The pixel values of the plurality of pixels form a pixel value vector. The apparatus includes processing circuitry configured to compress and/or decompress the segment. Compressing the segment includes computing a plurality of expansion coefficients by expanding the pixel value vector into a plurality of basis vectors that are discrete approximations of solutions of a boundary value problem of the Helmholtz equation on the segment of the image in a second coordinate system rotated relative to the first coordinate system. Decompressing the segment includes computing the pixel value vector by forming a linear combina- (Continued)

tion of the basis vectors using the plurality of expansion coefficients.

16 Claims, 12 Drawing Sheets

(56) References Cited

FOREIGN PATENT DOCUMENTS

| WO | 2017064645 A1 | 4/2017 | |
| WO | WO-2017064645 A1 * | 4/2017 | ........... H04N 19/122 |

OTHER PUBLICATIONS

Xu et al., "An Overview of Directional Transforms in Image Coding," Proceedings of 2010 IEEE International Symposium on Circuits and Systems (ISCAS), pp. 3036-3039, Institute of Electrical and Electronics Engineers, New York, New York (2010).
Zeng et al., "Directional Discrete Cosine Transforms—A New Framework for Image Coding," IEEE Transactions on Circuits and Systems for Video Technology, vol. 18, No. 3, pp. 305-313, Institute of Electrical and Electronics Engineers, New York, New York (Mar. 2008).
Xu et al., "Lifting-Based Directional DCT-Like Transform for Image Coding," IEEE Transactions on Circuits and Systems for Video Technology, vol. 17, No. 10, pp. 1325-1335, Institute of Electrical and Electronics Engineers, New York, New York (Oct. 2007).
Xu et al., "Directional Lapped Transforms for Image Coding," Data Compression Conference, pp. 142-151, Institute of Electrical and Electronics Engineers, New York, New York (2008).
Ye et al., "Improved H.264 Intra Coding Based on Bi-Directional Intra Prediction, Directional Transform, and Adaptive Coefficient Scanning," IEEE International Conference on Image Processing (ICIP 2008), pp. 2116-2119, Institute of Electrical and Electronics Engineers, New York, New York (2008).
Lan et al., "Enhancement of HEVC using Signal Dependent Transform (SDT)," 52nd Meeting, Warsaw, Poland, VCEG-AZ08r1, 5, pp. 1-7, ITU—Telecommunications Standardization Sector (Jun. 19-26, 2015).
Saxena et al., "CE7: Mode-dependent DCT/DST for intra prediction in video coding," Joint Collaborative Team on Video Coding (JCT-VC) of ITU-T SG16 WP3 and ISO/IEC JTC1/SC29/WG11, 4th Meeting: Daegu, KR, JCTVC-D033, pp. 1-7 (Jan. 20-28, 2011).
Chen et al., "Coding tools investigation for next generation video coding," COM 16-C 806-E, pp. 1-7, International Telecommunication Union, Geneva, Switzerland (Jan. 2015).
Alshina et al., "Known tools performance investigation for next generation video coding," 52nd Meeting: Warsaw, Poland, VCEG-AZ05, pp. 1-7, ITU—Telecommunications Standardization Sector (Jun. 19-26, 2015).
Fracastoro et al., "Steerable Discrete Cosine Transform," MMSP'15, total 6 pages, Xiamen, China (Oct. 19-21, 2015).
Sullivan, "Video Coding: Recent Developments for HEVC and Future Trends," Data Compression Conference, Snowbird, Utah, pp. 1-25 (Mar. 30, 2016).
"Series H: Audiovisual and Multimedia Systems, Infrastructure of audiovisual services—Coding of moving video," ITU-T H.265, total 664 pages, International Telecommunication Union, Geneva, Switzerland (Dec. 2016).
Strang, "The Discrete Cosine Transform," SIAM Review, vol. 41, No. 1, pp. 135-147, Society for Industrial and Applied Mathematics (1999).
Selesnick et al., "A Diagonally-Oriented DCT-Like 2D Block Transform," Proc. of SPIE, vol. 8138, pp. 1-14 (2011).
Zhao et al., "Mode-dependent non-separable secondary transform," COM 16-C 1044-E, pp. 1-5, International Telecommunication Union, Geneva, Switzerland (Sep. 2015).

* cited by examiner

IMAGE AND VIDEO PROCESSING APPARATUSES AND METHODS

CROSS-REFERENCE TO RELATED APPLICATIONS

This application is a continuation of International Application No. PCT/EP2017/079929, filed on Nov. 21, 2017, the disclosure of which is hereby incorporated by reference in its entirety.

TECHNICAL FIELD

The present invention relates to the fields of image and video coding. More specifically, the invention relates to image processing apparatuses and video processing apparatuses as well as corresponding methods.

BACKGROUND

Two-dimensional discrete cosine transforms (herein also referred to as 2D-DCT or simply DCT) are the most widely used unitary transforms for image and video coding applications. The 2D-DCT is based on an orthogonal, complete and separable basis set of cosine functions, and is used to represent the image information of a rectangular image or image block by spatial frequency coefficients. Generally, the energy of smooth signals is concentrated in the low frequency DCT coefficients. Continuity at the interval boundaries has made DCT-II more attractive and the most preferred transform in image and video coding standards. For practical purposes DCT coefficients are computed by fast and efficient algorithm schemes.

Occasionally, a residual block, which is a result of subtraction of a prediction block from an original image block, contains directional patterns and structure. Angular intra prediction, which defines a prediction block by replicating boundary pixels along lines in the prediction direction, has been effectively used to remove directional lines along the angular direction. However, other directional patterns may still remain in the residual block for several reasons. First, angular prediction might not remove all the directional structures in the original image block, even after increasing the number of intra-prediction angular-directions to 33 in the high efficiency video coding (HEVC) standard and 65 directions in proposals for beyond HEVC. Second, whenever there are discontinuities along the edges of the predicted block, angular prediction might actually insert directional stripes that did not exist in the original image.

The DCT is a separable basis and deals relatively well with horizontal or vertical patterns. However, when DCT is applied to a residual block containing directional content, discontinuities along the horizontal and vertical directions may increase the number of non-zero coefficients at high frequencies as a result of the Gibbs phenomenon. Therefore, the representation of oriented residual blocks may not be efficient.

To overcome this shortcoming, several attempts were made to develop directional transforms, i.e. transforms that are better tuned to particular orientations. Three categories of directional transforms for image coding, which include reorganization of pixels, lifting, and data-dependent directional transforms, are discussed in J. Xu et al., "An overview of directional transforms in image coding", IEEE Proc. of IEEE Int. Sym. On Circuits and Systems (ISCAS), 2010. These state-of-the-art directional transform methods will be briefly introduced in the following.

In reorganization-based approaches, block pixels are reorganized according to a selected direction. Conventional 1D transforms of variable length are applied. The coefficients produced by the directional transforms are rearranged and a second pass of 1D transforms is applied to the coefficients (see B. Zeng & J.-J. Fu, "Directional discrete cosine transforms—a new framework for image coding", IEEE Trans. Circ. Syst. for Video Technology, 2008). These methods are suboptimal since the transformation is not orthogonal in 2D, and the 2D relationships between the original pixels are distorted.

Lifting-based methods also apply 1D transforms, but they use 2D image interpolations. Similarly to pixel reorganization methods, they have inefficiencies associated with the fact that oriented lines at the center and the corners of a square block are of different lengths. For further reference, more details about lifting-based methods can be found in H. Xu, J. Xu & F. Wu, "Lifting-based directional DCT-like transform for image coding", IEEE Trans. Circ. Syst. for Video Technology, 2007 and in J. Xu et al., "Directional lapped transforms for image coding", Data Compression Conf., 2008.

Data-dependent transforms are based on training data in the spirit of the Karhunen-Loeve transform (KLT). As seen in Y. Ye & M. Karczewicz, "Improved H.264 intra coding based on bi-directional intra prediction, directional transform, and adaptive coefficient scanning", IEEE Int. Conf. Image Processing, 2008, mode-dependent directional transforms (MDDT) are derived from KLT using prediction residuals from training video data. Signal dependent transform (SDT) is used for various block sizes (see C. Lan et al., "Enhancement of HEVC using signal dependent transform (SDT)", MPEG doc. m37503, 2015 and ITU-T SG16/Q6 Doc. VCEG-AZ08, 2015). Since the transform matrices are data dependent, and may be arbitrary according to the training data, the implementation of the transforms may not be efficient for future data.

Directional transforms fit in a recent trend where the codec can use additional transforms to DCT, not necessarily directional. The signaling of the selected transform as well as search complexity can be saved if the transform can be linked to the intra-prediction mode. The DCT/discrete sine transform (DST) mode-dependent combination (A. Saxena & F. Fernandes, "CE7: Mode-dependent DCT/DST for intra prediction in video coding", JCTVC-D033, 2011) and the explicit multiple transform methods (J. Chen et al., "Coding tools investigation for next generation video coding", ITU-T SG16 Doc. COM16-C806, 2015) use this approach. The explicit multiple transform methods use selected transforms from the DCT/DST families (DST-VII, DCT-VIII, DST-I and DCT-V) in addition to the current DCT-II transform used in HEVC.

Another recent approach uses a secondary transform applied to the coefficients of the conventional 2D-DCT/DST. Among the secondary transforms are the Rotational Transform (E. Alshina et al., "Known tools performance investigation for next generation video coding", ITU-T SG16 Doc. VCEG-AZ05, 2015), which uses Given's rotation matrix, and the mode dependent non-separable 4×4 secondary transform (X. Zhao et al., "Mode-dependent non-separable secondary transform", ITU-T SG16/Q6 Doc. COM16-C1044, 2015), which are applied for each 4×4 sub-group of transform coefficients within an intra-block coding unit. Similarly, a method that rotates pairs of 2D-DCT vectors with the same eigenvalues in their 2D subspace was suggested in G. Fracastoro & E. Magli., "Steerable discrete cosine transform", IEEE Int. Workshop on Multimedia Signal Proc.

(MMSP), 2015. While these transforms are orthogonal, the rotations occur in a high-dimensional space. The resulting basis vectors do not necessarily suit to represent rotations in the image plane.

In light of the above, there is still a need for improved image and video processing apparatuses and methods allowing, in particular, for a more efficient encoding and decoding of images or image blocks having directional patterns or structures in their residual images or image blocks.

SUMMARY

The present disclosure provides improved image and video processing apparatuses and methods allowing, in particular, for a more efficient encoding and decoding of images or image blocks having directional patterns or structures in their residual images or image blocks.

As used herein, an image or image signal comprises a plurality of pixels, wherein each pixel is associated with at least one pixel value. The pixel value may indicate a brightness of a color component (e.g., u, v, red, green, or blue), or it may indicate an overall brightness of the pixel (e.g., for a monochrome picture).

As used herein, a video signal or video sequence is a set of subsequent frames presenting a motion picture. In other words, a video signal or video sequence consists of a plurality of images (also referred to as pictures or frames).

As used herein, segmentation is the process of partitioning an image or image region, in particular a video coding block, into two or more image segments or partitions.

As used herein, coding tree unit (CTU) denotes the root of a coding structure of the video sequence of a pre-defined size, containing a part of an image (e.g., 64×64 pixels). A CTU can be partitioned into several coding units (CUs).

As used herein, coding unit (CU) denotes a basic coding structure of the video sequence of a pre-defined size, containing a part of an image belonging to a CTU. A CU can be partitioned into further CUs.

The devices and method described herein may be used for representing motion information for segmentation based block partitioning, used in conjunction with rectangular block partitioning, which is useful for inter-prediction in video coding applications.

The devices and methods described herein may be used for inter-prediction between images to exploit the temporal redundancy of video sequences. The change of information observed between the current image and a reference image can often be approximated by translational movement, e.g., linear movement within the image plane. Block based motion compensation is the dominating realisation of this paradigm, where a reference image is partitioned into rectangular blocks and each pixel within a block is exhibiting the same motion. Thus, the movement of the entire block, called the prediction block, can be described by a single motion vector.

Embodiments described herein can yield an optimal solution in terms of minimum representation energy error on the basis of a solid and well-known mathematical formulation of boundary value eigen problems (the representation energy error being the energy of a difference (e.g., root mean square error) between the original data and the expansion used by the representation). Embodiments described herein formulate eigen problems in a way similar to 2D-DCT/DST. i.e., rotate the Cartesian coordinates to a user-predefined directional angle and solve the discrete directional Laplacian eigen problem. The solutions according to the embodiments described herein can be reduced to the 2D-DCT/DST by setting the rotation angle to zero for obtaining the well-known 2D-DCT/DST, which are eigen solutions of the discrete Laplacian eigen problem.

More specifically, according to a first aspect, the present disclosure describes an image processing apparatus for compressing or decompressing a segment of an image, the segment comprising a plurality of pixels, each pixel comprising a pixel value and a pixel position defined by a first coordinate system, the pixel values of the plurality of pixels forming a pixel value vector. The apparatus comprises: a processing unit configured to compress the segment or configured to decompress the segment, wherein compressing the segment comprises computing a plurality of expansion coefficients by expanding the pixel value vector into a plurality of basis vectors, wherein the basis vectors are discrete approximations of solutions of a boundary value problem of the Helmholtz equation on the segment of the image in a second coordinate system, wherein the second coordinate system is rotated relative to the first coordinate system by a rotation angle; and wherein decompressing the segment comprises computing the pixel value vector by forming a linear combination of the basis vectors using the plurality of expansion coefficients.

Thus, an improved image processing apparatus is provided allowing, in particular, for a more efficient encoding and decoding of images or image segments having directional patterns or structures in their residual images or image segments.

In a further possible implementation form of the first aspect, the processing unit is configured to represent a discretised Laplace operator of the Helmholtz equation as a system matrix A and to determine the basis vectors as eigenvectors of the system matrix A.

In a further possible implementation form of the first aspect, the processing unit is configured to represent the discretised Laplace operator of the Helmholtz equation on the basis of the following matrix:

$$\nabla_{\|}^2 = \frac{1}{4h^2} \begin{bmatrix} \sin 2\theta & 4\sin^2\theta & -\sin 2\theta \\ 4\cos^2\theta & -8 & 4\cos^2\theta \\ -\sin 2\theta & 4\sin^2\theta & \sin 2\theta \end{bmatrix},$$

wherein $\nabla_{\|}^2$ denotes the discretised Laplace operator, $\theta$ denotes the rotation angle between the first coordinate system and the second coordinate system and h denotes the horizontal distance between two subsequent pixels and the vertical distance between two subsequent pixels.

In a further possible implementation form of the first aspect, the processing unit is configured to generate the system matrix A on the basis of a plurality of boundary conditions defined for a boundary of the segment.

In a further possible implementation form of the first aspect, the processing unit is configured to define the discretized Laplace operator as a three-point stencil. The plurality of pixels can comprise a plurality of boundary pixels and a plurality of domain pixels, wherein the pixel values of the plurality of boundary pixels and the plurality of domain pixels can be interpolated using the pixel values of the segment in the first coordinate system.

In a further possible implementation form of the first aspect, the plurality of pixels comprise a plurality of boundary pixels and a plurality of domain pixels and wherein the processing unit is configured to generate the system matrix A by scanning the plurality of pixels of the segment on the basis of a scanning order to define an order of the plurality of domain pixels of the segment and to determine the number of the plurality of domain pixels of the segment, wherein the number of the plurality of domain pixels of the segment defines the size K×K of the system matrix A.

In a further possible implementation form of the first aspect, the processing unit is configured to generate the i-th column of the system matrix A by centering the discretized Laplace operator on the i-th pixel of the plurality of domain pixels as defined by the scanning order.

In a further possible implementation form of the first aspect, the processing unit is configured to define the i-th column of the system matrix A on the basis of the plurality of boundary conditions, wherein the plurality of boundary conditions comprise Dirichlet boundary conditions, Neumann boundary conditions and/or mixed Dirichlet and Neumann boundary conditions.

In a further possible implementation form of the first aspect, the processing unit is further configured to determine the eigenvalues of the system matrix A and to arrange the eigenvectors of the system matrix A in an increasing order.

According to a second aspect, the present disclosure describes an image processing method for compressing or decompressing a segment of an image, the segment comprising a plurality of pixels, each pixel comprising a pixel value and a pixel position defined by a first coordinate system, the pixel values of the plurality of pixels forming a pixel value vector. The method comprises: compressing or decompressing the segment, wherein compressing the segment comprises computing a plurality of expansion coefficients by expanding the pixel value vector into a plurality of basis vectors, wherein the basis vectors are discrete approximations of solutions of a boundary value problem of the Helmholtz equation on the segment of the image in a second coordinate system, wherein the second coordinate system is rotated relative to the first coordinate system by a rotation angle within the image plane; and wherein decompressing the segment comprises computing the pixel value vector by forming a linear combination of the basis vectors using the plurality of expansion coefficients.

Thus, an improved image processing method is provided allowing, in particular, for a more efficient encoding and decoding of images or image segments having directional patterns or structures in their residual images or image segments.

According to a third aspect, the present disclosure describes a video processing apparatus for encoding or decoding a video signal, wherein the video processing apparatus comprises an image processing apparatus according to the first aspect, wherein the video processing apparatus is configured during encoding to compress a segment of a residual image generated from the video signal or configured during decoding to decompress a segment of a residual image generated from the video signal.

Thus, an improved video processing apparatus is provided allowing, in particular, for a more efficient encoding and decoding of images or image segments having directional patterns or structures in their residual images or image segments.

In a further possible implementation form of the third aspect, the eigenvectors of the system matrix A define a transformation matrix V and wherein for encoding or decoding the video signal the processing unit is configured to scan the column vectors of the transformation matrix V according to an increasing order of eigenvalues associated with the eigenvectors of the system matrix A.

In a further possible implementation form of the third aspect, the processing unit is further configured to determine the orthogonal set of transforms on the basis of a rate distortion criterion.

In a further possible implementation form of the third aspect, the processing unit is further configured to determine the plurality of boundary conditions for the plurality of boundary pixels of the segment on the basis of another image segment of the same image or a different image of the video signal.

In a further possible implementation form of the third aspect, the processing unit is configured to choose as the rotation angle between the first coordinate system and the second coordinate system a direction angle associated with an intra prediction mode selected by the video processing apparatus for intra predicting the segment.

According to a fourth aspect, the present disclosure describes a computer program comprising program code for performing the image processing method according to the second aspect or when executed on a computer.

The invention can be implemented in hardware, in software, or in a combination of hardware and software. For example, the processing unit may be any kind of programmable or non-programmable circuitry that is configured to carry out the operations described above. The processing unit may comprise hardware as well as software. For example, the processing unit may comprise one or more processors and a transitory or non-transitory memory that carries a program which causes the processing unit to perform the respective operations when the program is executed by the one or more processors.

BRIEF DESCRIPTION OF THE DRAWINGS

Further embodiments will be described with respect to the following figures, wherein.

In the various figures, identical reference signs have been used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present invention may be placed. It is understood that other aspects may be utilized and structural or logical changes may be made without departing from the scope of the present invention. The following detailed description, therefore, is not to be taken in a limiting sense, as the scope of the present invention is defined be the appended claims.

For instance, it is understood that a disclosure made in connection with a method will generally also hold true for a device or system configured to perform the method and vice versa. For example, if a method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
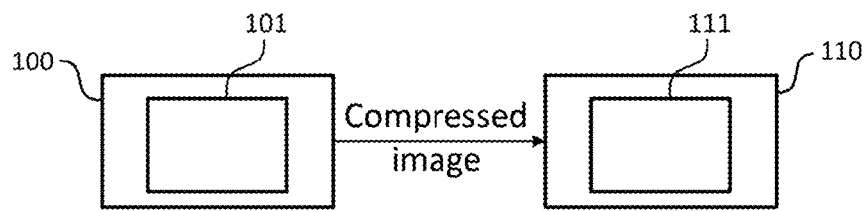
FIG. 1 schematically illustrates an example of an image processing apparatus for compressing an image according to an embodiment and an example of an image processing apparatus for decompressing an image according to an embodiment.

FIG. 1 schematically illustrates an image processing apparatus 100 according to an embodiment and an image processing apparatus 110 according to an embodiment. The image processing apparatus 100 comprises a processor 101 and the image processing apparatus 110 comprises a processor 111.

The image processing apparatus 100 is configured to compress a segment of an image, wherein the segment comprises a plurality of pixels. Each pixel comprises a pixel value and a pixel position defined by a first coordinate system 401; the pixel values of the plurality of pixels form a pixel value vector, as will be described in more detail further below. The processor 101 of the apparatus 100 is configured to compress the image segment, including computing a plurality of expansion coefficients by expanding the pixel value vector into a plurality of basis vectors, wherein the basis vectors are discrete approximations of solutions of a boundary value problem of the Helmholtz equation on the segment of the image in a second coordinate system 402. The second coordinate system 402 is rotated relative to the first coordinate system 401 by a rotation angle 403 (larger than 0°).

The image processing apparatus 110 is configured to decompress a segment of an image, wherein the segment comprises a plurality of pixels. Each pixel comprises a pixel value and the pixel values of the plurality of pixels form a pixel value vector, as will be described in more detail further below. The processor 111 of the apparatus 110 is configured to decompress the image segment, including computing the pixel value vector by forming a linear combination of the basis vectors according to the plurality of expansion coefficients. As shown in FIG. 1, the image processing apparatus 110 is configured to decompress a compressed image provided by the image processing apparatus 100.

Figure 2:
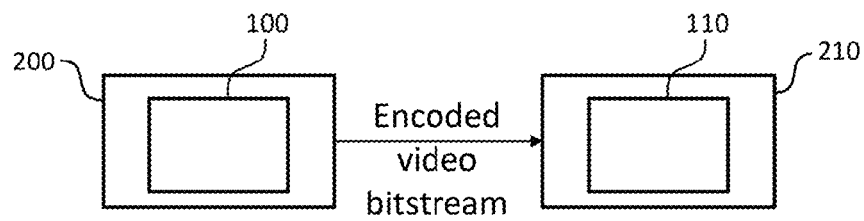
FIG. 2 schematically illustrates an example of a video processing apparatus for encoding a video signal according to an embodiment and an example of a video processing apparatus for decoding a video signal according to an embodiment.

FIG. 2 schematically illustrates a video processing apparatus 200 for encoding a video signal according to an embodiment and a video processing apparatus 210 for decoding a video signal according to an embodiment.

The video processing apparatus 200 comprises the image processing apparatus 100 of FIG. 1 and is configured to compress a segment of a residual image generated from the video signal.

The video processing apparatus 210 comprises the image processing apparatus 110 of FIG. 1 and is configured to decompress a segment of a residual image generated from the encoded video signal. As shown in FIG. 2, the video processing apparatus 210 is configured to decompress an image segment of a residual image generated from an encoded video bitstream provided by the video processing apparatus 200.

Figure 3:
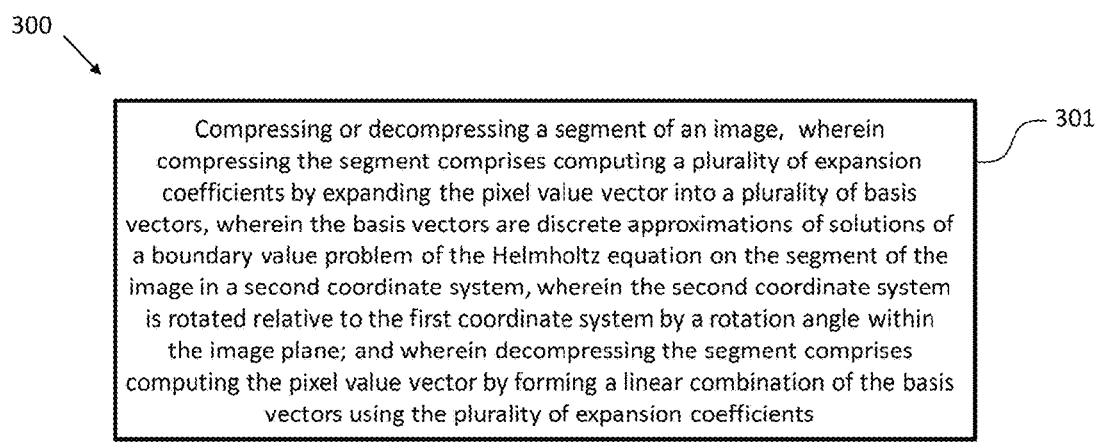
FIG. 3 schematically illustrates an example of an image processing method according to an embodiment.

FIG. 3 schematically illustrates an image processing method 300 according to an embodiment. The image processing method 300 is configured for compressing or decompressing a segment of an image, wherein the segment comprises a plurality of pixels. Each pixel comprises a pixel value and a pixel position defined by a first coordinate system 401, wherein the pixel values of the plurality of pixels form a pixel value vector. The image processing method 300 comprises a step 301 of compressing or decompressing the segment of the image, wherein compressing the segment comprises computing a plurality of expansion coefficients by expanding the pixel value vector into a plurality of basis vectors. The basis vectors are solutions of a discretized boundary value problem of the Helmholtz equation on the segment of the image in a second coordinate system 402. Decompressing the segment comprises computing the pixel value vector by forming a linear combination of the basis vectors according to the plurality of expansion coefficients.

Before describing further embodiments of the image processing apparatus 100, 110 of FIG. 1, the video processing apparatus 200, 210 of FIG. 2 and the image processing method 300 of FIG. 3 in more detail, some mathematical background will be introduced.

The continuous directional Laplacian eigen problem $$\nabla_{\|}^2 f = -\lambda f$$

is a boundary value problem with Dirichlet boundary conditions, $f=0$, on the boundary of $\Omega$, or Neumann boundary conditions, $\partial f/\partial n=0$, on the boundary of $\Omega$, where $f$ is an eigenfunction which corresponds to its eigenvalue $\lambda$; $\nabla_{\|}^2$ is the second derivative in the x' direction, i.e. $\nabla_{\|}^2 = \partial^2/\partial x'^2$ when $f$ is expressed as a function of rotated coordinates x' and y'; x and y are the standard (non-rotated) Cartesian coordinates (see FIG. 4); $\Omega$ is an arbitrary bounded domain in $R^2$ that has a piecewise smooth boundary; and n is in the normal to the boundary of $\Omega$.

Figure 4:
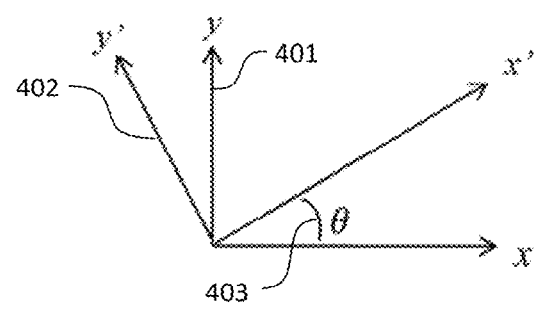
FIG. 4 schematically illustrates an example of two coordinate systems relative to each other by a rotation angle.

In the continuous case, $\nabla_{\|}^2$ can also be expressed in the non-rotated coordinate system 401 as:

$$\nabla_{\|}^2 f = \cos^2\theta \frac{\partial^2 f}{\partial x^2} + 2\cos\theta\sin\theta \frac{\partial^2 f}{\partial x \partial y} + \sin^2\theta \frac{\partial^2 f}{\partial y^2}$$

where $f(x,y)$ is function of the x and y, and $\theta$ is the rotated angle 403, as illustrated in FIG. 4.

In embodiments, the continuous directional Laplacian eigen problem for a given domain with boundary conditions is discretized and solved in the discrete domain. Each continuous problem expressed by a differential equation has many discrete approximations which can be expressed by difference equations. Therefore, the discrete case has a new level of variety and complexity. Examples of the arising complexities can be the choices of the grid to sample the continuous domain; the grid to sample the continuous differential operator; the number of points approximating the continuous differential operator; the boundary points for applying the boundary conditions (e.g., on a grid or between grid points); or/and the type of boundary conditions, such as Dirichlet, Neumann or mixed boundary conditions.

First of all, in an embodiment the Cartesian coordinates system 401 is used for sampling the continuous domain by using uniform sampling grids at the pixel locations of a given image. Since the continuous directional Laplacian is a function of a 1D variable along the rotated axis, an alternative candidate is the uniform sampling grid along parallel lines to the axes of the rotated coordinates, as shown in FIG. 5.

Figure 5:
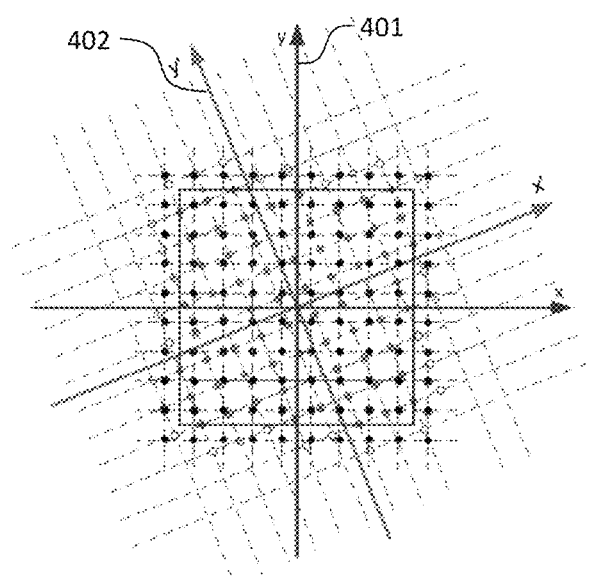
FIG. 5 schematically illustrates an example of sampling a continuous domain by uniform girds in two coordinate systems according to an embodiment.

However, for any rotation angle 403 which is not horizontal or vertical, the image samples do not coincide with the uniform grids of the rotated system 402 as seen in FIG. 5. An interpolation scheme can thus be used to approximate the image samples on the rotated grid. As a result, the complexity is increased as the interpolation is needed for each rotated angle 403 for which a directional transform is required.

Secondly, in an embodiment, the rotated Cartesian coordinate system 402 is used for sampling the continuous operator, as the directional Laplacian is a 1D operator along the direction of the rotated angle 403. However, since the results are given at grid points in the rotated system 402, a second interpolation may be used to transform the rotated coordinate system back to the non-rotated coordinate system 401, in order to express the operator results at sampling points of the given image.

It is worth noting that in the discrete case the interpolation generally induces couplings between neighboring pixels. However, for a rotation angle 403 where interpolation is not needed, and the image samples are located on the rotated system 402, and the boundary conditions for the parallel and the perpendicular directions are decoupled, the discrete solutions can be found separately for each line (or "string") of pixels along the rotated angle 403 (i.e., the parallel direction).

Embodiments described herein focus on a simpler solution which eliminates the two interpolation steps. A finite difference method can be used for the discrete approximation of the continuous directional Laplacian operator at the sampling points of the given image block (in the non-rotated Cartesian system 401).

By denoting $x_i$=ih, $y_j$=jh, $f(i,j)$=$f(x_i, y_j)$, where i,j=0,1, 2, . . . , N−1, h=1/N, and N is the block size and using the central difference and the Taylor series expansion about the point ($x_i$, $y_j$) for points on its immediate neighborhood, the following equations can be obtained:

$$\frac{\partial^2 f}{\partial x \partial y}\bigg|_{i,j} = \frac{f(i+1, j+1) - f(i+1, j-1) - f(i-1, j+1) + f(i-1, j-1)}{4h^2} + O(h^2)$$

$$\frac{\partial^2 f}{\partial x^2}\bigg|_{i,j} = \frac{f(i+1, j) - 2f(i, j) + f(i-1, j)}{h^2} + O(h^2)$$

-continued $$\frac{\partial^2 f}{\partial y^2}\bigg|_{i,j} = \frac{f(i, j+1) - 2f(i, j) + f(i, j-1)}{h^2} + O(h^2).$$

In embodiments described herein, $\nabla_\parallel^2 f$ in the discrete case is expressed for each direction angle θ as:

$$\nabla_\parallel^2 f = \frac{1}{4h^2}\{-8f(i, j) + 4\cos^2\theta[f(i-1, j) + f(i+1, j)] + 4\sin^2\theta[f(i, j-1) + f(i, j+1)] + \sin2\theta[f(i+1, j+1) - f(i+1, j-1) - f(i-1, j+1) + f(i-1, j-1)]\},$$

where θ is the rotation coordinate angle defined with respect to x axis, h is the spacing distance of the uniform Cartesian grids aligned with the non-rotated x and y coordinate system, and i and j are indices on the grids.

In embodiments described herein, the discrete directional Laplacian eigen problem (already mentioned above) can be expressed as an eigenvector (v)–eigenvalue (λ) problem:

$$Av = \lambda v,$$

where A is a discretized form of the directional Laplacian. The matrix A is referred to herein as the system matrix. The system matrix A can be determined, for example, by the discretization of the image segment (herein also referred as domain), the boundary conditions and a discrete form of directional second-order derivatives. The boundary conditions are specified on the boundaries of the discrete segment domain.

For example, the system matrix A may be defined through the following parallel stencil Laplacian:

$$\nabla_\parallel^2 = \frac{1}{4h^2}\begin{bmatrix} \sin2\theta & 4\sin^2\theta & -\sin2\theta \\ 4\cos^2\theta & -8 & 4\cos^2\theta \\ -\sin2\theta & 4\sin^2\theta & \sin2\theta \end{bmatrix}.$$

The system matrix can be diagonalized by an orthogonal transform matrix V, that is:

$$V^T A V = \Lambda.$$

The columns of the orthogonal transform matrix V are the eigenvectors of the discrete directional Laplacian. Λ is the diagonal matrix of eigenvalues of A, i.e. each diagonal element of Λ is one of the eigenvalues λ. In principle, the eigenvectors can be placed in any order; however, for efficient representation of smooth signals using the first n eigenvectors, it is recommended to place the eigenvectors in an increasing order of the eigenvalues.

Using different boundary conditions and/or different discrete forms of the directional Laplacian, an extensive family of 2D directional orthogonal DCT/DST-like solution types can be generated and the best type can be chosen, e.g., according to the boundary values of a residual block with a directional structure. The best transform type may be selected in order to minimize rate distortion or by using information from the boundary of adjacent blocks.

Derivation of the solution can comprise two stages as follows. During a first stage, a transform matrix V is constructed for each of a plurality of directions (which can be done once for a given image segment). The first stage may comprise the following steps: defining the preferred boundary conditions; determining a discretization type of the directional Laplacian; and generating the 2D orthogonal and complete transform by constructing a system matrix and computing the eigenvalues and eigenvectors of the matrix. The columns of the transform matrix are the eigenvectors of the discrete directional Laplacian, in increasing order of the corresponding eigenvalues.

During a second stage, transform coefficients (also called expansion coefficients) of image data are computed by multiplying a vector of pixel values (p) with the transpose transform matrix ($c=V^T p$). The image data may be residual image data, e.g., a difference between a current block and a predicted block. The pixel values can be reconstructed from the transform coefficients by multiplying the vector of transform coefficients with the transform matrix ($p_{rec} = \Sigma_{k=1}^{K} c_k v_k = Vc$). Since the transformation is orthogonal, the inverse transform matrix is the transposed transform matrix.

Embodiments described herein can provide various types of discrete directional orthogonal transforms. For example, "DST-like" and "DCT-like" transforms, which are generated by specifying Dirichlet or Neumann boundary conditions for a segment, can be adaptively applied to a residual block according to continuity at its boundaries. Embodiments for a square segment can reduce significantly the memory requirements by introducing a subset of only 16 transform matrixes out of 65 directions, from which all other transform matrixes can be obtained. Furthermore, the symmetric and asymmetric properties of eigenvectors in each transform matrix lead to reductions of memory and run-time significantly. The transform coefficients generated by the image processing apparatus 100, 110 can be encoded, for example, by using a spatial predictor. The spatial predictor may be selected based on the boundary conditions; using information from spatial neighborhood; and/or using context model selected according to the boundary conditions.

In an embodiment, the boundary conditions are selected based on information from spatial predictor, and coefficient scaling and quantization are based on the size of the image segment. In another embodiment, coefficient scanning is performed according to the increasing order of the eigenvalues.

The embodiments described herein can offer an increased coding gain. Several embodiments have been tested numerically using DCT-like version of the directional transform, that is, one embodiment for each square block size N=4, 8, 16 and 32. In each test, pixel values (e.g., residual pixel values) of an image segment (e.g., an image block of 4×4) have been transformed by a transform matrix that diagonalizes a discrete form of a directional Laplacian. The transformed pixel values have been further encoded using entropy-coding. These DCT-like versions of the directional transform have been implemented within HM-16.6-KTA-2.0 as an additional and alternative transform (in a rate-distortion) to the three KTA-2.0's EMT transform candidates. The directional transform was tested only when the intra prediction direction is one of the 65 angular directions, i.e., neither DC nor planar. The coding gain compared to HM16.6-KTA-2.0 are improved by 0.8% for All-Intra (AI) configuration, 0.7% for Random Access (RA) configuration and 0.4% for both Low delay P (LDP) and Low delay B (LDB) configurations with bit-rate savings in the range of 0.5% to 1.4% on average for the six classes (A-F) of test sequences in Common Test Conditions (CTC). This demonstrates the effectiveness of the discrete directional transform in intra coding for beyond HEVC. These results are comparable to most of the tools in Joint Exploration Model (JEM), which contribute less than 1% of the coding gain according to G. Sullivan, "Video Coding: Recent Developments for HEVC and Future Trends", Data Compression Conference, 2016.

Furthermore, running time and memory complexity can be reduced significantly as described below.

Memory may be an issue in order to store for each square block of size N=4,8,16,32, a K×K transform matrix for each of the 65 intra prediction angular directions, where $K=N^2$. However, such memory complexity can be significantly reduced to about ⅛ of the original size by exploiting both spatial symmetry (a factor of 4) and spectral symmetry (another factor of 2). For example, using spatial symmetry only a subset of 16 matrices (i.e., the subset range of angular directions 2 to 17) out of the 65 matrices needs to be stored for each block size. The transform matrices for other directions are generated form this subset by changing the scanning order of the elements of the stored transforms. Furthermore, using spectral symmetry an eigenvector of a directional transform matrix (neither horizontal nor vertical) is either symmetric $v_k(i,j)=v_k(N-j, N-i)$ or anti-symmetric or anti-symmetric $v_k(i,j)=-v_k(N-j, N-i)$ with respect to 180-degrees rotations around the center of the N×N block, i=0, 1, . . . , N−1; j=0, 1, . . . , N−1. More specifically, since one-half (i.e., N×N/2) of the eigenvectors are symmetric, and the other half are asymmetric, only the first one-half entries in the scan of each eigenvector needs to be stored.

Furthermore, regarding computation complexity, SIMD operations can be used to reduce the running-time, both at the encoder and the decoder's side. We obtain about ¼ reduction using 128 bits word-length and 4×32 bits result when two 16 bits values are multiplied. Such multiplications of 16 bits values are found in the inverse transform, when a transform coefficient and an eigenvector are multiplied, as well as in the forward transform for the inner-product of the eigenvector and residual vector of sample.

Using the above reduction in memory and computation complexity in the implementation of the discrete directional transform within HM-16.6-KTA-2.0 as described above, the encoding and decoding run-times compared to the baseline (HM-16.6-KTA-2.0) are on average 128% and 110% for All-Intra (AI) configuration; 107% and 105% for Random Access (RA) configuration, 106% and 102% for LDB configuration, and 109% and 108% for LDP configuration respectively.

Figure 6:
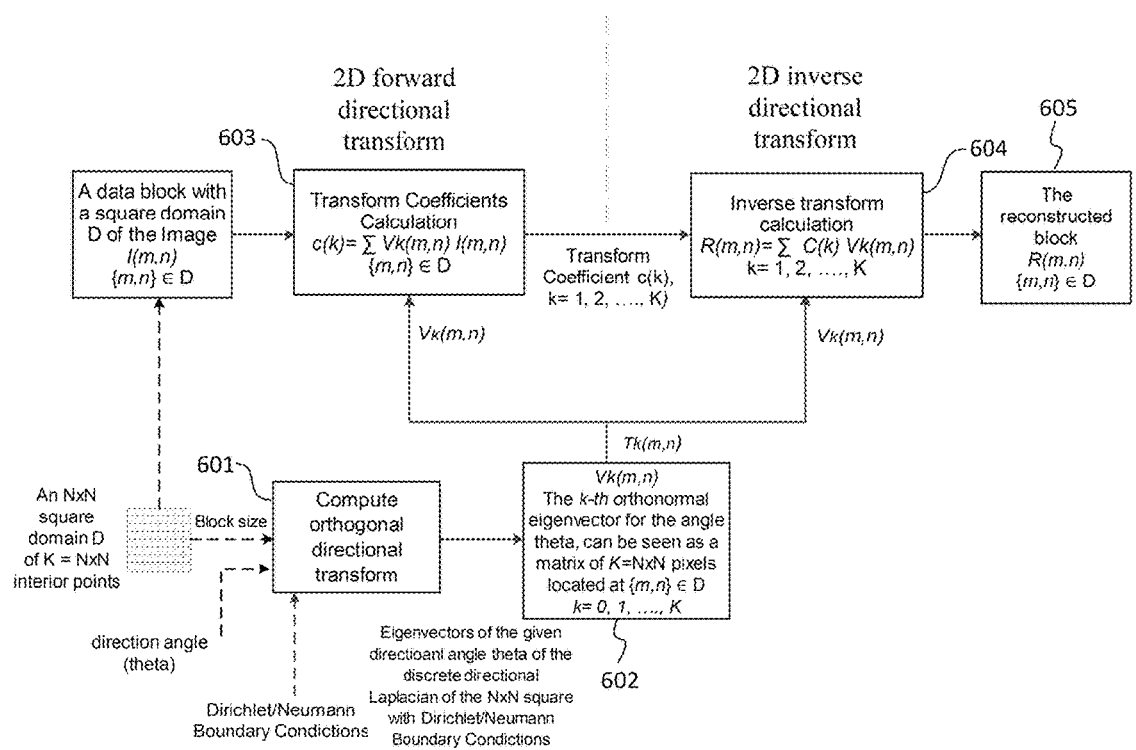
FIG. 6 schematically illustrates an example of processing steps of an image processing apparatus for compressing an image segment according to an embodiment and an example of an image processing apparatus for decompressing an image segment according to an embodiment.

Corresponding processing steps implemented in the image processing apparatus 100 according to an embodiment and the image processing apparatus 110 according to an embodiment are illustrated in FIG. 6. The lower part of FIG. 6 illustrates generation of the eigenvectors and the transformation matrix (blocks 601 and 602) on the basis of the direction angle and boundary conditions. The left upper part of FIG. 6 illustrates generation of the transform coefficients by the image processing apparatus 100 (block 603) on the basis of the transformation matrix. On the right of the upper part of FIG. 6 the use of the transform coefficients by the image processing apparatus 110 is illustrated for reconstructing the image segment (blocks 604 and 605).

Figure 7:
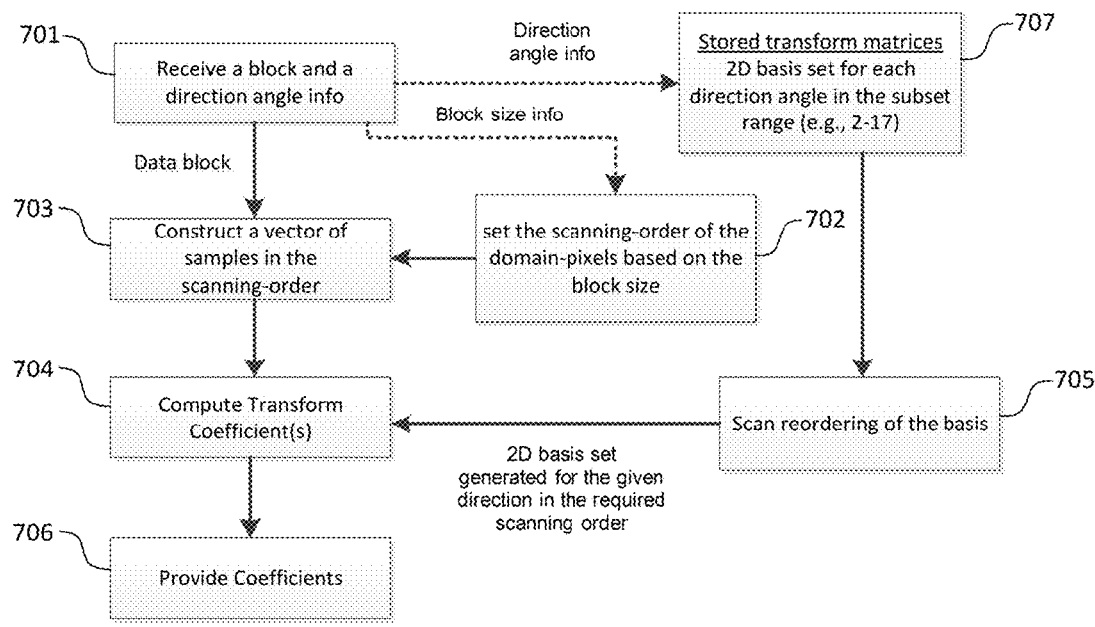
FIG. 7 schematically illustrates an example of processing steps of an image processing apparatus for compressing or encoding an image segment according to an embodiment.
Figure 8:
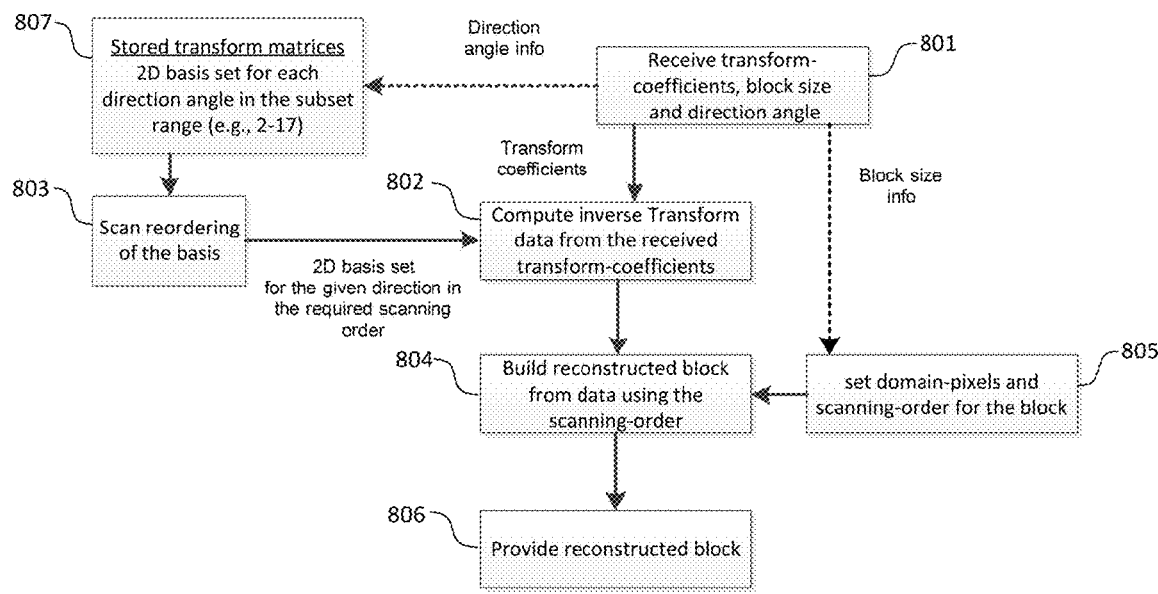
FIG. 8 schematically illustrates an example of processing steps of an image processing apparatus for decompressing or decoding an image segment according to an embodiment.

FIG. 7 schematically illustrates in more detail processing steps performed by the image processing apparatus 100 for compressing or encoding an image segment according to an embodiment. The image segment may be part of a video frame or an image block. In a step 701, the image processing apparatus 100 receives the image segment and possibly further domain information, such as the size of a square block or vertices of the image segment, chosen boundary conditions and/or direction angles. In a step 702 the image processing apparatus 100 can use this domain information to set the image domain pixels and the scanning order. In a step 707, the image processing apparatus 100 stores transform matrices for a plurality of direction angles in a subset range. In a step 703 the image processing apparatus 100 constructs a vector of segment samples on the basis of a scanning order. In steps 704, 705 the image processing apparatus 100 computes the transform coefficients on the basis of the eigenvectors of the system matrix in the manner described above. In a step 706 the image processing apparatus 100 provides the obtained transform coefficients to the image processing apparatus 110. The corresponding processing steps implemented in the image processing apparatus 110 for decompressing the compressed image segment provided by the image processing apparatus 100 are illustrated in FIG. 8. As will be appreciated, the processing steps illustrated in FIG. 7 can define a processing loop of the image processing apparatus 100 or a corresponding video encoding apparatus 200 (as will be described in more detail further below in the context of FIG. 11).

Referring now to FIG. 8, on the basis of the received transform coefficients, the size of a square or a signal indicating the domain of the image segment and the direction angle (step 801), the image processing apparatus 110 regains stored transform matrices for each direction angle in a subset range (step 807) and inverses the received transform coefficients using the transform matrix (i.e. the eigenvectors of the system matrix) (steps 802 and 803). As will be appreciated, the image processing apparatus 110 should use the same eigenvectors as the image processing apparatus 100. In a step 804 the image processing apparatus 110 reconstructs the image segment on the basis of the pre-defined scanning order (step 805). In a step 806 the image processing apparatus 110 outputs the reconstructed image segment. As will be appreciated, the processing steps illustrated in FIG. 8 can define a processing loop of the image processing apparatus 110 or a corresponding video decoding apparatus 210 (as will be described in more detail further below in the context of FIG. 12).

Figure 9:
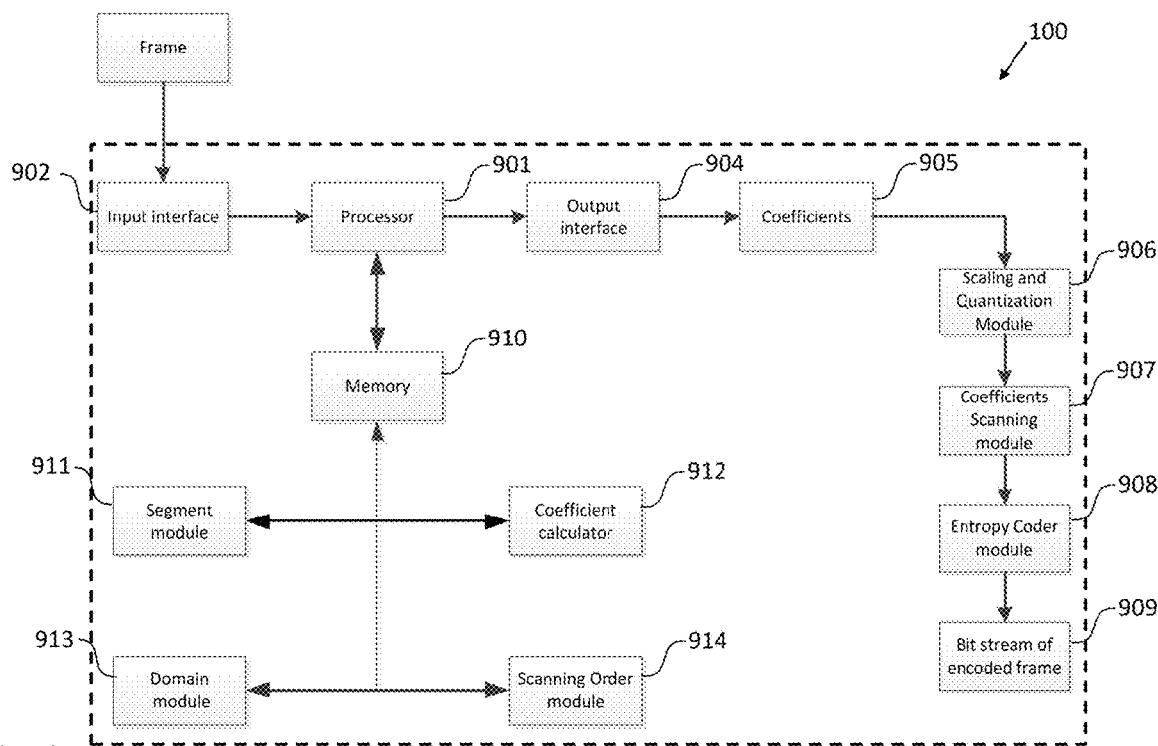
FIG. 9 schematically illustrates an example of an image processing apparatus for compressing or encoding a frame according to an embodiment.

FIG. 9 schematically illustrates an embodiment of the image processing apparatus 100. In the embodiment shown in FIG. 9 the image processing apparatus 100 comprises an input interface 902 for receiving a frame, image or image segment. In addition to the processor 101 already described above, the image processing apparatus 100 shown in FIG. 9 further comprises a memory 910, a segment module 911, a domain module 913, a scanning order module 914 and a coefficient calculator 912 for determining the transform coefficients in the manner described above. In FIG. 9 the segment module 911, the domain module 913, the scanning order module 914 and the coefficient calculator 912 are shown as blocks separate from the processor 101. These blocks may be implemented as dedicated software and/or hardware blocks, as software modules for controlling the processor 101 so that the processor 101 will perform the operations described herein. The image processing apparatus 100 shown in FIG. 9 may further comprise an output interface 904 for providing the transform coefficients determined by the coefficient calculator 912 to a scaling and quantization module 906, a coefficient scanning module 907 and an entropy coder module 908 of the image processing apparatus 100. The entropy coder module 908 of the image processing apparatus 100 is configured to provide the encoded frame, image or image segment, for instance, in form of a bit stream.

Figure 10:
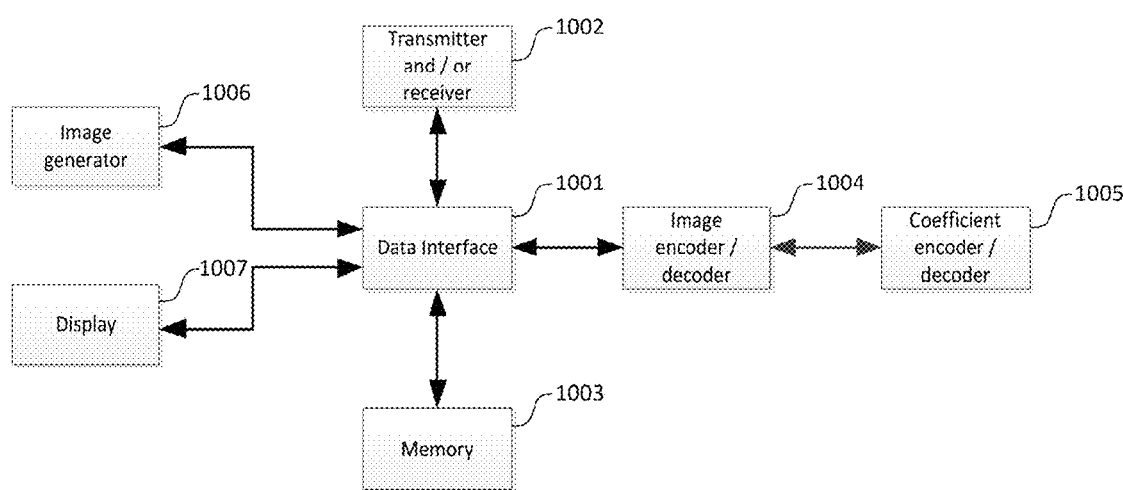
FIG. 10 schematically illustrates an example of a video processing apparatus according to an embodiment.

FIG. 10 schematically illustrates the video processing apparatus 200, 210 according to an embodiment. In the shown example, the video processing apparatus 200, 210 comprises the image encoder/decoder 1004. In the case of the video encoding apparatus 200 the image encoder/decoder 1004 can be the image processing apparatus 100. In the case of the video decoding apparatus 210 the image encoder/decoder 1004 can be the image processing apparatus 110.

In addition to the image encoder/decoder 1004 the video processing apparatus 200, 210 shown in FIG. 10 further comprises a transmitter/receiver 1002, a data interface 1001, a memory 1003 and a coefficient encoder/decoder 1005. Moreover, the video processing apparatus 200, 210 shown in FIG. 10 can comprise an image generator 1006 and/or a display 1007.

Figure 11:
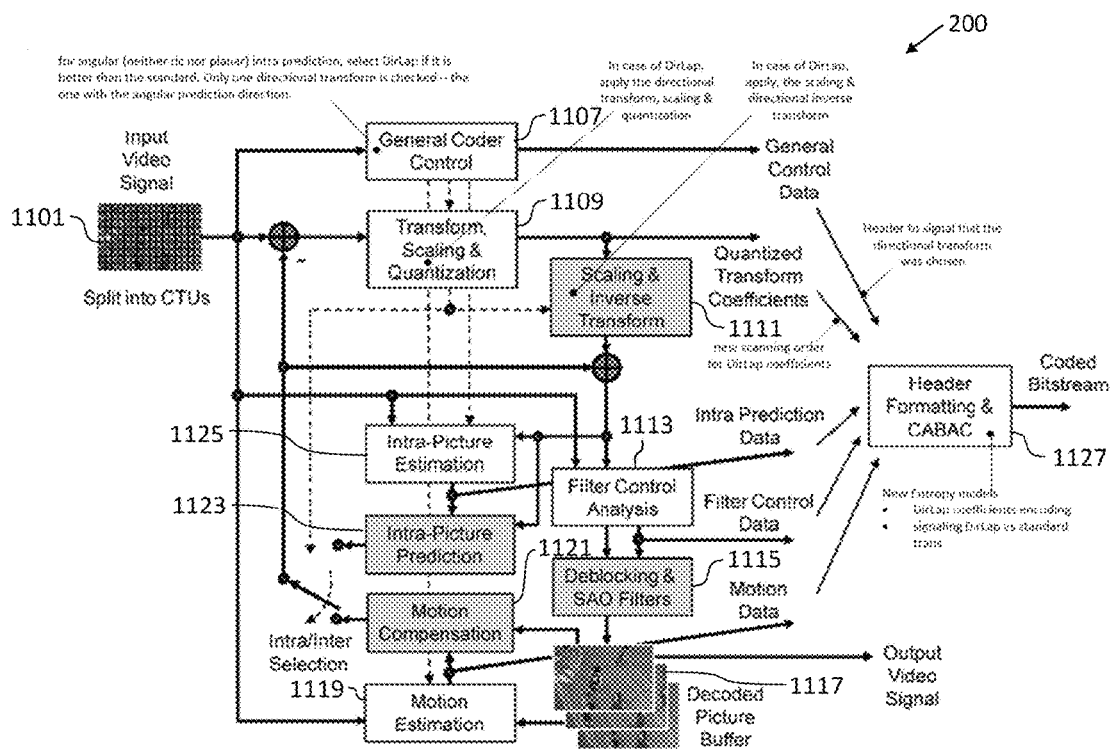
FIG. 11 schematically illustrates an example of a video processing apparatus for encoding a video signal according to an embodiment.

FIG. 11 schematically illustrates an embodiment of the video encoding apparatus 200, which is based on the hybrid encoder architecture according to the H.265 standard. As the hybrid encoder architecture according to the H.265 standard is well known, the following description will focus on the differences of the embodiment shown in FIG. 11 in comparison with the hybrid encoder architecture according to the H.265 standard.

In hybrid video coding, an input frame is normally divided into blocks for further processing. The block partitioning is conveyed to the decoder, such as the video decoding apparatus 210 shown in FIG. 12. Usually, the first frame of an input video sequence is an intra frame, which is encoded using only intra prediction. An intra frame can be decoded without information from other frames. The video coding blocks of subsequent frames following the first intra frame can be coded using inter or intra prediction.

The video encoding apparatus 200 shown in FIG. 11 comprises a splitting or partitioning block 1101 for splitting the input video signal into a plurality of CTUs. As indicated by an arrow in FIG. 11, a general coder control block 1107 of the video encoding apparatus 200 can be configured to decide for each block in the quad tree if it should be encoded using the discrete directional transform as presented above. In case of an encoding using the discrete directional transform, a block 1109 of the video encoding apparatus 200 is configured to apply the transform, scaling and quantization to each of the image segments defining the block of the quad tree and a block 1111 of the video encoding apparatus 200 is configured to apply a scaling and an inverse transform to each of these segments.

Moreover, the video encoding apparatus 200 shown in FIG. 11 comprises an intra-prediction estimation block 1125, an intra-picture prediction block 1123, a motion compensation block 1121, a motion estimation block 1119, a filter control analysis block 1113, a deblocking & SAO filters block 1115, a decoded picture buffer 1117 and a header formatting & CABAC block 1127, which are generally known from the hybrid encoder architecture according to the H265 standard. The intra-prediction estimation block 1125 is configured to provide a separate intra predictor for each of the image segments defining the block of the quad tree. Likewise, the motion estimation block 1119 is configured to provide a separate motion vector (MV) for each of the image segments.

The general control data provided by the general coder control block 1107 can comprise a header for signaling the usage of the directional transform. The header formatting & CABAC block 1127 can use new entropy models for signaling the transform coefficients for the image segments, the type of the transform and the intra predictors for each image segment.

Figure 12:
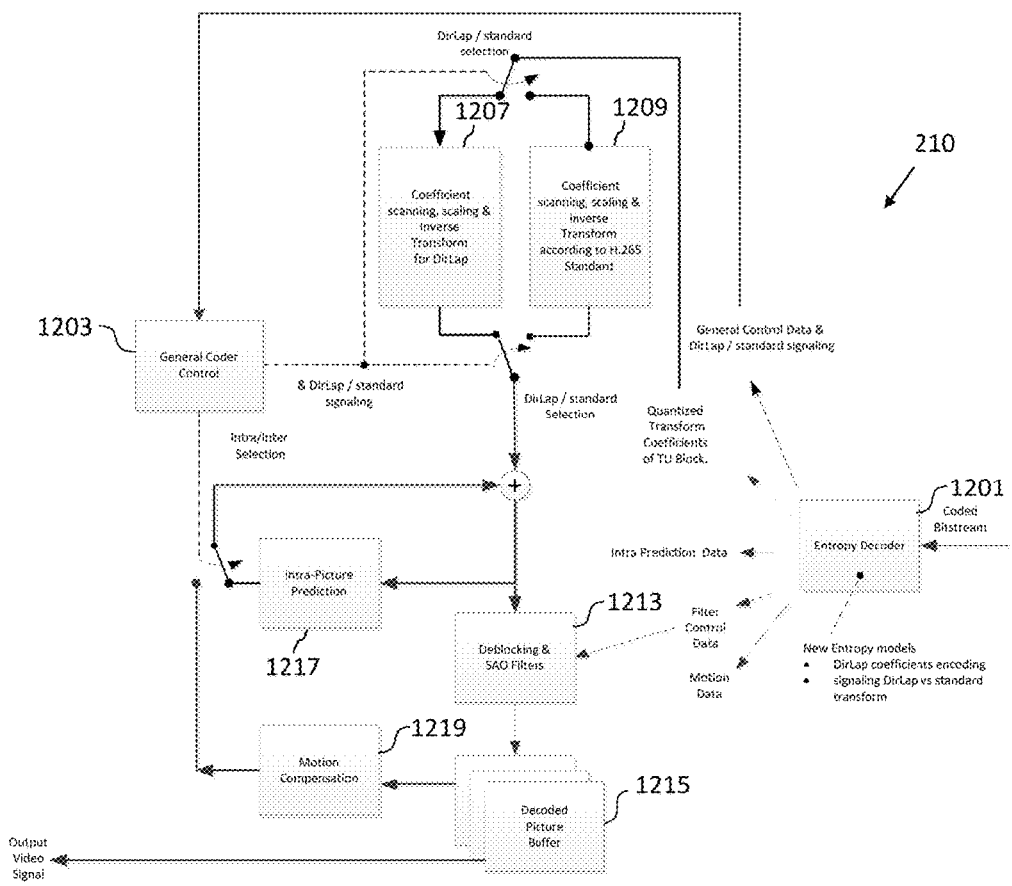
FIG. 12 schematically illustrates an example of a video processing apparatus for decoding a video signal according to an embodiment corresponding to the video encoding apparatus of FIG. 11.

FIG. 12 schematically illustrates a corresponding embodiment of the video decoding apparatus 210. As in the case of the video encoding apparatus 200 shown in FIG. 11, the video decoding apparatus 210 shown in FIG. 12 is based on the H.265 architecture as well. As the hybrid decoder architecture according to the H.265 standard is well known, the following description will focus on the differences of the embodiment shown in FIG. 12 in comparison with the hybrid decoder architecture according to the H.265 standard.

In addition to the general components or blocks of a H.265 hybrid decoder, namely an entropy decoder 1201, a block 1209 for coefficient scanning, scaling and inverse transform according to H.265 standard, a deblocking & SAO filters block 1213, a decoded picture buffer 1215, a motion compensation block 1219, an intra-picture prediction block 1217 and a general coder control block 1203, the video decoding apparatus 210 shown in FIG. 12 further comprises a block 1207 configured to select transform coefficients as well as the scanning order for constructing the domain of each segment by using the discrete directional transform method.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The word "coding" may refer to encoding as well as decoding.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. An image processing apparatus for compressing or decompressing a segment of an image, the segment comprising a plurality of pixels, each pixel comprising a pixel value and a pixel position defined by a first coordinate system, the pixel values of the plurality of pixels forming a pixel value vector, the apparatus comprising:
    processing circuitry configured to:
        compress the segment of the image by computing a plurality of expansion coefficients by expanding the pixel value vector into a plurality of basis vectors, the basis vectors being discrete approximations of solutions of a boundary value problem of the Helmholtz equation on the segment of the image in a second coordinate system, the second coordinate system being rotated relative to the first coordinate system by a rotation angle; and/or
        decompress the segment of the image by computing the pixel value vector by forming a linear combination of the basis vectors using the plurality of expansion coefficients,
    wherein the processing circuitry is configured to represent a discretised Laplace operator of the Helmholtz equation as a system matrix A and to determine the basis vectors as eigenvectors of the system matrix A, and
    wherein the plurality of pixels comprise a plurality of boundary pixels and a plurality of domain pixels, and wherein the processing circuitry is configured to generate the system matrix A by scanning the plurality of pixels of the segment based on a scanning order to define an order of the plurality of domain pixels of the segment and to determine a number of the plurality of domain pixels of the segment, wherein the number of the plurality of domain pixels of the segment defines a size K×K of the system matrix A.

2. The image processing apparatus of claim 1, wherein the processing circuitry is configured to represent the discretised Laplace operator of the Helmholtz equation on the basis of the following matrix:

$$\nabla_\|^2 = \frac{1}{4h^2}\begin{bmatrix} \sin2\theta & 4\sin^2\theta & -\sin2\theta \\ 4\cos^2\theta & -8 & 4\cos^2\theta \\ -\sin2\theta & 4\sin^2\theta & \sin2\theta \end{bmatrix},$$

wherein $\nabla_\|^2$ denotes the discretised Laplace operator, $\theta$ denotes the rotation angle between the first coordinate system and the second coordinate system, and h denotes a horizontal distance between two subsequent pixels and a vertical distance between two subsequent pixels.

3. The image processing apparatus of claim 1, wherein the processing circuitry is configured to generate the system matrix A on the basis of a plurality of boundary conditions defined for a boundary of the segment.

4. The image processing apparatus of claim 1, wherein the processing circuitry is configured to define the discretized Laplace operator as a three-point stencil.

5. The image processing apparatus of claim 1, wherein the processing circuitry is configured to generate an i-th column of the system matrix A by centering the discretized Laplace operator on an i-th pixel of the plurality of domain pixels as defined by the scanning order.

6. The image processing apparatus of claim 5, wherein the processing circuitry is configured to define the i-th column of the system matrix A based on a plurality of boundary conditions, wherein the plurality of boundary conditions comprise Dirichlet boundary conditions, Neumann boundary conditions, and/or mixed Dirichlet and Neumann boundary conditions.

7. The image processing apparatus of claim 1, wherein the processing circuitry is further configured to determine eigenvalues of the system matrix A and to arrange the eigenvectors of the system matrix A in an increasing order.

8. An image processing method for compressing or decompressing a segment of an image, the segment comprising a plurality of pixels, the plurality of pixels comprising a plurality of boundary pixels and a plurality of domain pixels, each pixel comprising a pixel value and a pixel position defined by a first coordinate system, the pixel values of the plurality of pixels forming a pixel value vector, the method comprising:

compressing the segment, wherein compressing the segment comprises computing a plurality of expansion coefficients by expanding the pixel value vector into a plurality of basis vectors, wherein the basis vectors are discrete approximations of solutions of a boundary value problem of the Helmholtz equation on the segment of the image in a second coordinate system, wherein the second coordinate system is rotated relative to the first coordinate system by a rotation angle within the image plane; and/or decompressing the segment, wherein decompressing the segment comprises computing the pixel value vector by forming a linear combination of the basis vectors using the plurality of expansion coefficients, wherein the method further comprises:

representing a discretised Laplace operator of the Helmholtz equation as a system matrix A and to determine the basis vectors as eigenvectors of the system matrix A, and generating the system matrix A by scanning the plurality of pixels of the segment based on a scanning order to define an order of the plurality of domain pixels of the segment and to determine a number of the plurality of domain pixels of the segment, wherein the number of the plurality of domain pixels of the segment defines a size K×K of the system matrix A.

9. A video processing apparatus for encoding or decoding a video signal, wherein the video processing apparatus comprises:

the image processing apparatus according to claim 1, wherein the video processing apparatus is configured, during encoding, to compress a segment of a residual image generated from the video signal and/or the video processing apparatus is configured, during decoding, to decompress a segment of a residual image generated from the video signal.

10. The video processing apparatus of claim 9, wherein the eigenvectors of the system matrix A define a transformation matrix V, and wherein for encoding and/or decoding the video signal, the processing circuitry is configured to scan column vectors of the transformation matrix V according to an increasing order of eigenvalues associated with the eigenvectors of the system matrix A.

11. The video processing apparatus of claim 9, wherein the processing circuitry is further configured to determine an orthogonal set of transforms based on a rate distortion criterion.

12. The video processing apparatus of claim 9, wherein the processing circuitry is configured to choose, as the rotation angle between the first coordinate system and the second coordinate system, a direction angle associated with an intra prediction mode selected by the video processing apparatus for intra predicting the segment.

13. A computer program comprising program code that, when executed on a computer, causes the computer to perform the method of claim 8.

14. The image processing method of claim 8, the method comprising:

generating the system matrix A on the basis of a plurality of boundary conditions defined for a boundary of the segment.

15. The image processing method of claim 8, the method comprising:

determining a plurality of boundary conditions for the plurality of boundary pixels of the segment on the basis of another image segment of the same image or a different image of the video signal.

16. A video processing apparatus for encoding or decoding a video signal, wherein the video processing apparatus comprises:

an image processing apparatus for compressing or decompressing a segment of an image, the segment comprising a plurality of pixels, each pixel comprising a pixel value and a pixel position defined by a first coordinate system, the pixel values of the plurality of pixels forming a pixel value vector, the apparatus comprising:

processing circuitry configured to:

compress the segment of the image by computing a plurality of expansion coefficients by expanding the pixel value vector into a plurality of basis vectors, the basis vectors being discrete approximations of solutions of a boundary value problem of the Helmholtz equation on the segment of the image in a second coordinate system, the second coordinate system being rotated relative to the first coordinate system by a rotation angle; and/or decompress the segment of the image by computing the pixel value vector by forming a linear combination of the basis vectors using the plurality of expansion coefficients, wherein the processing circuitry is configured to represent a discretised Laplace operator of the Helmholtz equation as a system matrix A and to determine the basis vectors as eigenvectors of the system matrix A, and wherein the video processing apparatus is configured, during encoding, to compress a segment of a residual image generated from the video signal and/or the video processing apparatus is configured, during decoding, to decompress a segment of a residual image generated from the video signal, and wherein the processing circuitry is further configured to determine a plurality of boundary conditions for the plurality of boundary pixels of the segment on the basis of another image segment of the same image or a different image of a video signal.

* * * * *